United States Patent
Tomimura et al.

(10) Patent No.: US 6,802,430 B2
(45) Date of Patent: Oct. 12, 2004

(54) CORROSION-RESISTANT FUEL TANK AND FUEL-FILLER TUBE FOR MOTOR VEHICLE

(75) Inventors: Kouki Tomimura, Shin-Nanyo (JP); Yasutoshi Hideshima, Shin-Nanyo (JP); Naoto Hiramatsu, Shin-Nanyo (JP); Toshiro Adachi, Shin-Nanyo (JP); Kazushi Shirayama, Shin-Nanyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 36 days.

(21) Appl. No.: 10/397,780

(22) Filed: Mar. 26, 2003

(65) Prior Publication Data

US 2003/0183626 A1 Oct. 2, 2003

(30) Foreign Application Priority Data

Mar. 27, 2002 (JP) .......................... 2002-087912

(51) Int. Cl.[7] .......................... B65D 6/00; B32B 15/04; B32B 15/18; C25D 5/26; B05D 1/18
(52) U.S. Cl. .................. 220/562; 220/4.14; 428/685; 428/609; 428/650; 428/658; 427/404; 427/406; 427/419.1; 427/435
(58) Field of Search ................. 220/562, 4.14; 428/685, 609, 650, 658; 427/404, 406, 419.1, 435

(56) References Cited

U.S. PATENT DOCUMENTS

| | | | | |
|---|---|---|---|---|
| 5,023,113 A | * | 6/1991 | Boston et al. ............. 427/320 |
| 5,116,645 A | * | 5/1992 | Boston et al. ............. 427/320 |
| 5,286,442 A | * | 2/1994 | Uematsu et al. ............. 420/40 |
| 5,462,611 A | * | 10/1995 | Uematsu et al. ............ 148/325 |
| 5,496,514 A | * | 3/1996 | Yamauchi et al. ............ 420/34 |
| 5,591,391 A | * | 1/1997 | Igarashi et al. .............. 420/38 |
| 5,602,214 A | * | 2/1997 | Lin et al. .................... 525/478 |
| 5,709,836 A | * | 1/1998 | Fujisawa et al. ............. 420/41 |
| 5,807,842 A | * | 9/1998 | Buscemi et al. ............. 208/47 |
| 5,942,184 A | * | 8/1999 | Azuma et al. ................ 420/67 |
| 6,143,364 A | * | 11/2000 | Nakamori et al. .......... 427/310 |
| 6,231,690 B1 | * | 5/2001 | Azuma ....................... 148/287 |
| 6,645,318 B2 | * | 11/2003 | Takahashi et al. .......... 148/325 |
| 2004/0076776 A1 | * | 4/2004 | Ishikawa et al. ........... 428/34.1 |

\* cited by examiner

Primary Examiner—John J. Zimmerman
Assistant Examiner—Jason L Savage
(74) Attorney, Agent, or Firm—Webb Ziesenheim Logsdon Orkin & Hanson, P.C.

(57) ABSTRACT

A fuel tank and a fuel-filler tube, which maintain excellent corrosion-resistance over a long term even in a severely corrosive atmosphere, is made of a ferritic stainless steel sheet good of formability. The steel sheet, which has elongation of 30% or more after fracture by a uniaxial tensile test and minimum Lankford value (value-$r_{min}$) of 1.3 or more, is formed to a product shape, and paint is cathodically electrodeposited on a surface of the formed stainless steel sheet. The stainless steel sheet may be one coated with an Al or Zn plating layer. When the fuel tank or fuel-filler tube is fabricated by welding, Zn-rich paint is preferably applied to a welded part in prior to cathodic electrodeposition coating.

14 Claims, 1 Drawing Sheet

CORROSION-RESISTANT FUEL TANK AND FUEL-FILLER TUBE FOR MOTOR VEHICLE

BACKGROUND OF THE INVENTION

1. Field of the Invention

The present invention relates to a fuel tank and a fuel-filler tube for supplying such fuel as gasoline or methanol-containing gasoline to an engine of a motor vehicle.

2. Description of the Related Art

A fuel tank is installed in an automobile or a motorcycle for storage of gasoline or the like. If the fuel tank is poor of airtightness, gasoline evaporated in the fuel tank diffuses to the open air. Diffusion of gasoline also occurs from a fuel-filler tube poor of airtightness.

In order to inhibit diffusion of gasoline harmful on the environment, the fuel tank and the fuel-filler tube shall have an airtight structure. But, airtightness of a conventional fuel tank made of synthetic resin becomes worse as the lapse of time. Although use of a steel sheet coated with a Zn or Al plating layer is proposed as material for a fuel tank, the plating layer often flaked or cracked during forming the steel sheet to a product shape. Such defects as flakes and cracks act as starting points of corrosion, when a fuel tank is exposed to a corrosive atmosphere containing organic acids generated by degradation of gasoline. If the corrosion leads to pinholes in the fuel tank, the airtight structure of the fuel tank is broken. An external surface of a fuel tank or a fuel-filler tube is also suffered from corrosion, since it is exposed to a severely corrosive atmosphere especially in the cold region where a deicing salt is scattered on roads.

Applicability of stainless steel, i.e. representative corrosion-resistant material, for a fuel tank or fuel-filler tube has been researched and examined in order to maintain an airtight structure over a long term. But, stainless steel is often cracked during forming it to a product shape, due to its worse formability than plain steel. Cracks degrade airtightness of the fuel tank or fuel-filler tube, resulting in diffusion of gasoline to the open air.

Pitting corrosion sometimes occurs at work-induced defects and leads to pinholes especially at an inner surface part of the fuel tank or fuel-filler tube in contact with sour gasoline.

Crevice corrosion is also one of problems in a fuel tank or fuel-filler tube made of stainless steel. Since a fuel tank or fuel-filler tube is fabricated by seam-welding a steel sheet and fixing various members thereto, formation of narrow gaps cannot be avoided. When rainwater invades to the narrow gaps, stainless steel is suffered from crevice corrosion. Especially in the region where a deicing salt is scattered on roads, the narrow gaps are attacked by crevice corrosion due to invasion and condensation of the deicing salt. The crevice corrosion also causes pinholes and substantially damages faculties of the fuel tank or fuel-filler tube.

SUMMARY OF THE INVENTION

The present invention aims at provision of a fuel tank and a fuel-filler tube, which maintains an airtight structure without corrosion over a long term, made of a stainless steel sheet good of formability.

The fuel tank or fuel-filler tube proposed by the present invention is made of a ferritic stainless steel sheet, which is coated with a corrosion-preventing layer. The stainless steel sheet has elongation of 30% or more after fracture by a uniaxial tensile test and minimum Lankford value (value-$r_{min}$) of 1.3 or more. The corrosion-preventing layer may be a cathodic electrodeposition paint film or a plating layer of Al, Zn or a Zn alloy containing one or more of Fe, Ni, Co, Mg, Cr, Sn and Al. When the fuel tank or fuel-filler tube is fabricated by welding steel sheets, Zn-rich paint is preferably applied to a welded part in prior to electrodeposition of the paint film.

Preferable composition of the ferritic stainless steel comprises of C up to 0.015 mass %, Si up to 0.5 mass %, 11.0–25.0 mass % of Cr, N up to 0.020 mass %, 0.05–0.50 mass % of Ti, 0.10–0.50 mass % of Nb, B up to 0.010 mass %, optionally one or more of Mo up to 3.0 mass %, Ni up to 2.0 mass %, Cu up to 2.0 mass % and Al up to 4.0 mass %, and the balance being Fe except inevitable impurities.

PREFERRED EMBODIMENTS OF THE INVENTION

Figure 1:
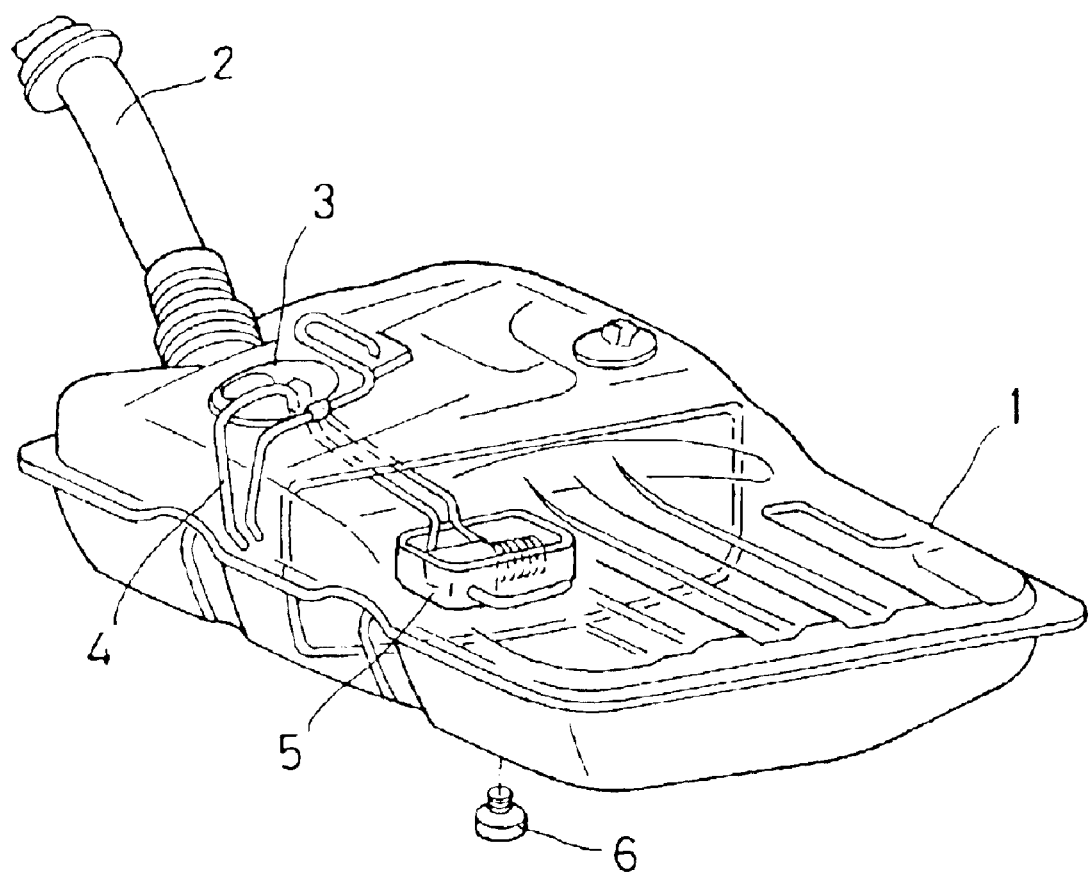
FIG. 1 is a schematic view illustrating a fuel tank.

A fuel tank is manufactured by a multi-stepped process for press-forming steel sheets to upper and lower halves with complicated shapes and seam-welding the halves together, as shown in FIG. 1. Various members, e.g. an inlet tube 2, a fuel tube 3, a fuel return tube 4, a sub-tank 5 and a drain plug 6, are fixed to a body of the fuel tank 1 by welding, brazing or the like. A fuel-filler tube such as the inlet tube 2 is also manufactured and partially expanded at its one or both ends by the same multi-stepped process. Since the steel sheet is subjected to complicated plastic deformation accompanied with elongation and compression, it is often cracked in a drawing, impact forming or secondary reforming step due to lack of formability.

Since ferritic stainless steel is harder and less expansible than plain steel due to higher Cr content, formability, which is improved by bulging or the similar plastic deformation originated in ductility of the material, is not expected. In this regard, Lankford value (value-r) is used as an index representing reduction of thickness and metal flow along a widthwise direction, for researching properties of a stainless steel sheet which can be press-worked to a product shape. The inventors have examined Lankford value (value-r) of various stainless steels for researching a stainless steel sheet suitable for the purpose, and discovered that formability of a stainless steel sheet is properly represented by a minimum value (value-$r_{min}$) among Lankford values (value-r) along a rolling direction (direction-L), a direction (direction-D) crossing the direction-L with 45 degrees and a direction (direction-T) orthogonal to the direction-L. Many experimental results prove that elongation after fracture (hereinafter referred to as "total elongation") and a minimum value (value-$r_{min}$) are predominant factors on formability. In short, a ferritic stainless steel sheet with elongation of 30% or more after fracture by a uniaxial tensile test and a minimum Lankford value (value-$r_{min}$) of 1.3 or more can be formed to such a predetermined shape without cracks or other work-induced defects during drawing, impact forming or secondary reforming.

Total elongation is obtained as follows: Each steel sheet is sampled along direction-L and shaped to a test piece #13B regulated by JIS Z2201. The test piece is stretched at a rate of 10 mm/min until fracture, and the fractured parts are butted together to measure a distance between marked points. The measured value is compared with a distance before the tensile test, to calculate total elongation.

A minimum Lankford value (value-$r_{min}$) is obtained as follows: After a tensile strain of 15% is applied to the same test piece #13B, thickness and width of the test piece are measured. A natural logarithmic value of a reduction ratio of width is divided by a natural logarithmic value of a reduction ratio of thickness to calculate Lankford value (value-r) along each of directions-L, -D and -T. The smallest value among the calculation results is regarded as the minimum Lankford value (value-$r_{min}$).

Cathodic electrodeposition of paint and/or formation of an Al or Zn plating layer is effective for protection of a stainless steel sheet from corrosion in a corrosive atmosphere over a long term. A paint film may be applied directly to the stainless steel sheet or after being coated with the Al or Zn plating layer.

An interior of a fuel tank or fuel-filler tube is an atmosphere containing gasoline. Lower organic acids, which are generated by degradation of gasoline, transfer to a water phase and make the inner atmosphere corrosive. If a steel sheet coated with a plating layer by a conventional process is plastically deformed with heavy duty, the plating layer is often flaked at the heavily-deformed part, and base steel is exposed to the corrosive atmosphere and corroded in a short time. Exposure of base steel is inhibited by cathodic electrodeposition of a paint film, since cathodic electrodeposition allows penetration of paint to every nook and corner. Consequently, the painted steel sheet is protected from corroding attacks of sour gasoline.

A Zn plating layer, which is formed on a plain steel sheet, serves as a sacrifice anode for protecting base steel from corrosion. However, once the Zn plating layer is consumed for corrosion prevention, the base steel is directly exposed to a corrosive atmosphere. As a result, the base steel is corroded, and pinholes are formed in the end.

Propagation of corrosion is different between plain steel and stainless steel. In the case where base steel is a stainless steel sheet, corrosion products of Zn or Al act as corrosion inhibitors in addition to sacrificial dissolution of Zn. That is, the corrosion products adhere onto a surface of a stainless steel sheet and suppress oxidation-reduction, i.e. cathodic reaction in corrosion process. Flaked zinc hydroxide probably exhibits a pH-buffering function to moderate corroding conditions. These effects are noted in case of using stainless steel as base steel but not plain steel. The same corrosion-preventing effect is also noted in an atmospheric environment or as to a stainless steel sheet coated with a Zn plating layer containing one or more of Fe, Ni, Co, Mg, Cr, Sn and Al, as far as corrosion products adhere to a surface of the base steel.

Corrosion products of Al and Zn also prevent a stainless steel sheet from crevice corrosion. The corrosion products are mainly composed of hydroxides, and Al and Zn are metals with relatively higher solubility even in a neutral solution, so that generation of the corrosion products is accelerated under the crevice environment where chloric ion ($Cl^-$) is condensed. Consequently, a surface part of the stainless steel sheet at a narrow gap is protected from corrosion by adhesion of the corrosion products.

A stainless steel as base material of a fuel tank or fuel-filler tube preferably has the under-mentioned composition.

C up to 0.015 mass %

C is an element for precipitation of carbides, which act as seeds for random growth of re-crystallized ferrite grains during final-annealing. But, excess C above 0.015 mass % raises strength and lowers toughness of an annealed steel sheet.

Si up to 0.5 mass %

Si is added as a deoxidizing agent to molten steel, but has a big solution-hardening power. Excess Si above 0.5 mass % unfavorably hardens a steel sheet and lowers its toughness.

11.0–25.0 mass % of Cr

Cr is an essential element for corrosion-resistance of stainless steel. An effect of Cr on corrosion-resistance is noted at a ratio of 11.0 mass % or more, but excess Cr above 25.0 mass % causes degradation of toughness and formability.

N up to 0.020 mass %

N is a nitride-forming element. Nitrides, which are precipitated in steel matrix, act as seeds for random growth of re-crystallized ferrite grains during final-annealing. However, N raises strength of an annealed steel sheet, and excess N above 0.20 mass % causes degradation of toughness.

0.05–0.50 Mass % of Ti

Ti is an element, which stabilizes C and N and improves formability and corrosion-resistance. The effect of Ti is noted at a ratio of 0.05 mass % at least, but excess Ti above 0.50 mass % raises a steel cost and also causes surface defects originated in Ti-inclusions.

0.10–0.50 mass % of Nb

Nb is an element, which stabilizes C and N and improves impact strength and secondary formability. These effects are noted at a ratio of 0.10 mass % or more. But, excess Nb above 0.50 mass % raises a re-crystallization temperature and also causes degradation of formability, since a steel sheet becomes harder as an increase of Nb content.

B up to 0.0100 mass %

B stabilizes N and improves corrosion-resistance and formability, but excess B above 0.0100 mass % causes degradation of hot-workability and weldability.

Mo up to 3.0 mass %

Mo is an optional element for improvement of corrosion-resistance, but excess Mo above 3.0 mass % promotes solution-hardening, retards dynamic re-crystallization in a high-temperature region and causes degradation of hot-workability.

Ni up to 2.0 mass %

Ni is an austenite former. Ni content shall be controlled to 2.0 mass % or less in order to inhibit hardening of a stainless steel sheet.

Cu up to 2.0 mass %

Cu is an impurity inevitably included in steel from scraps during melting. Since excess Cu is harmful on hot-workability and corrosion-resistance, its upper limit is controlled to 2.0 mass %.

Al up to 4.0 mass %

Al is optionally added as a deoxidizing agent during steel-making and also effective for oxidation-resistance. But, excess Al above 4.0 mass % causes surface defects.

Mn up to 2.0 mass %

Mn, which is an austenite former, does not put harmful effects on steel material due to a small solution-hardening power. But, excess Mn above 2.0 mass % derives some troubles, e.g. generation of Mn-fume, during steel making.

P is an element harmful on hot-workability. The effect of P is suppressed by controlling P content to 0.050 mass % or less.

S up to 0.020 mass %

S is an element, which is likely to segregate at grain boundaries, and causes intergranular embrittlement unfavorable for hot-workability. The harmful effect of S is suppressed by controlling S content to 0.020 mass % or less.

V and Zr each up to 0.3 mass %

V is an optional element for improvement of formability due to stabilization of C as carbide, while Zr is also an optional element for improvement of formability and toughness due to stabilization of O as oxide. However, excess V or Zr causes degradation of productivity, so each content of V and Zr is controlled to 0.30 mass % at most.

Other elements, e.g. Ca, Mg, Co and REM (rare earth metals), is often included in stainless steel from scraps or the like. These elements do not put substantial effects on properties of a steel sheet, except for excess inclusions.

A ferritic stainless steel sheet is coated with a corrosion-preventing layer as follows:

Cathodic Electrodeposition Coating

The corrosion-preventing layer may be a paint film formed by a cathodic electrodeposition coating process, wherein a phosphated steel sheet is immersed in an aqueous paint solution, and direct current is applied between the steel sheet as a cathode and paint as an anode so as to electrodeposit the paint on a surface of the steel sheet. Epoxy paint is available for the purpose. Electrodeposition is continued until the paint is applied with 10 □m in dry thickness. The applied paint is dried and baked 15–20 minutes at 150–160° C.

The cathodic electrodeposition coating may be performed, after a stainless steel sheet or a Zn or Al-coated stainless steel sheet is formed to a product shape.

Coating with Zn or Al

A Zn or Al plating layer is also one of corrosion-preventing layers. The plating layer is formed on a surface of a stainless steel sheet by either one of galvanizing, hot-dipping and vapor deposition processes. In the case where a fuel tank is manufactured from the Zn or Al-coated stainless steel sheet, formed steel sheets are seam-welded together. During seam-welding, the Zn or Al plating layer is partially evaporated with a weld heat. If evaporation loss is too many, it can not be expected to realize an effect of corrosion products as corrosion inhibitors at a welded part. In this regard, the Zn or Al plating layer is preferably formed at an adhesion ratio of 5 g/m² or more, so as to remain the Zn or Al plating layer at narrow gaps even after seam-welding.

The Zn plating layer may be composed of a Zn alloy containing one or more of Fe, Ni, Co, Mg and Al, instead of a pure Zn plating layer. The components Fe, Ni, Co, Mg and Al are effective for corrosion-resistance, and do not impede generation of zinc hydroxide or oxide as a corrosion inhibitor.

Application of Zn-Rich Paint

A Zn-rich paint film is also one of corrosion-preventing layers. When a fuel tank or fuel-filter tube is fabricated by a welding process, base steel is sometimes exposed to the atmosphere due to partial evaporation of Zn or Al with a weld heat. The naked surface part is preferably coated with Zn-rich paint in prior to cathodic electrodeposition coating.

The Zn-rich paint contains zinc powder as a main component at a ratio of 80% or more and an inorganic or organic binder. The inorganic binder may be one or more of alkyl silicate, ethyl silicate, colloidal silicate and lithium silicate. The organic binder may be one or more of epoxy and alkyd resins. The Zn-rich paint optionally contains other components such as zinc oxide, chromate and ferric oxide. The Zn-rich paint may be applied to a stainless steel sheet by brushing or spray.

EXAMPLE

Several stainless steel sheets of 0.8 mm in thickness were used for fabrication a fuel tank as shown in FIG. 1. Each stainless steel sheet had composition shown in Table 1. Steels A to E have total elongation and minimum Lankford value (value-$r_{min}$) within ranges defined by the present invention, while those of steels F to H are out of the defined ranges. The total elongation and the value-$r_{min}$ were results of uniaxial tensile test for a stainless steel sheet before being formed to a product shape, and the value $r_{min}$ is a minimum among Lankford values (value-r) along directions-L, D and T.

TABLE 1

Chemical Composition of Stainless Steel Sheets used in Example

| Steel Kind | Alloying Elements (mass %) | | | | | | | value-$r_{min}$ | total elongation (%) | Note |
|---|---|---|---|---|---|---|---|---|---|---|
| | C | Si | Cr | N | Ti | Nb | B | Others | | | |
| A | 0.003 | 0.22 | 12.26 | 0.013 | 0.42 | 0.18 | 0.0044 | Ni:1.13, Al:2.27 | 1.6 | 37 | Invention |
| B | 0.005 | 0.15 | 15.64 | 0.005 | 0.26 | 0.32 | 0.0073 | Cu:1.25 | 1.7 | 35 | Examples |
| C | 0.008 | 0.09 | 16.54 | 0.007 | 0.18 | 0.25 | 0.0024 | — | 1.4 | 32 | |
| D | 0.007 | 0.08 | 17.89 | 0.007 | 0.20 | 0.25 | 0.0018 | Mo:0.95 | 1.5 | 33 | |
| E | 0.010 | 0.20 | 22.24 | 0.006 | 0.18 | 0.44 | 0.0015 | Ni:0.09, Mo:1.18 | 1.6 | 31 | |
| F | 0.040 | 0.26 | 16.58 | 0.007 | 0.12 | 0.26 | 0.0042 | Mo:1.26 | 1.1 | 28 | Comparative |
| G | 0.004 | 0.25 | 16.52 | 0.020 | 0.18 | 0.14 | 0.0025 | Cu:0.85 | 0.9 | 27 | |
| H | 0.012 | 1.20 | 14.25 | 0.014 | 0.27 | 0.02 | 0.0014 | — | 0.8 | 26 | |

The underlined figures are out of conditions defined by the present invention.

Some of the stainless steel sheets were coated with Al or Zn at an adhesion ratio of 30 g/m² by a galvanizing or hot-dip process. In case of galvanizing, each steel sheet was pre-treated by electrolytic reduction in a sulfate solution. In case of hot-dip, each steel sheet was flash-plated with Fe.

Zn and various Zn alloy plating layers were formed on steel sheets by galvanization in electrolyte solutions shown in Table 2. A Zn-Sn plating layer was formed by a hot-dip process using a molten Zn bath containing 20 mass % Sn. A Zn—Al plating layer was formed by a hot-dip process using a molten Zn bath containing 5 mass % Al.

Each coated steel sheet was formed to a product shape. Epoxy resin paint containing 75% Zn powder as a main component and a small amount of zinc oxide powder was sprayed to a welded part, so as to form a Zn-rich paint film. Thereafter, the steel sheet was coated with a paint film of 20±5 □m in dry thickness by a cathodic electrodeposition coating process.

Plain steel sheets coated with Pb and Al and 2D-finished SUS430 stainless steel sheets were used for comparison.

TABLE 2

Composition of Electrolyte Solution for Galvanization

| Plating Layer | ZnSO$_4$ · 7H$_2$O (g/l) | Others | (g/l) |
|---|---|---|---|
| Zn | 300~400 | NH$_4$Cl | 10~25 |
| Zn—Co | 300~400 | CoSO$_4$ · 7H$_2$O | 15 |
| Zn—Mg | 300~400 | MgSO$_4$ · 7H$_2$O | 100~200 |
| Zn—Fe | 300~400 | FeSO$_4$ · 7H$_2$O | 100~200 |
| Zn—Ni | 300~400 | NiSO$_4$ · 7H$_2$O | 100~200 |

Each product was examined by impact and corrosion tests as follows:

In the impact test, beads of 2 mm in diameter were bombarded to a product held at 5° C. with a pressure of 5 kgf/mm² for one hour, and then a surface of the product was observed to detect cracks. Products free from cracks were evaluated as ○, while cracked products were evaluated as x.

Corrosion-resistance was examined by a cyclic corrosion test, whereby a cycle of 15-minutes spray a 5% NaCl solution, 60-minutes drying in an atmosphere of 35% RH at 60° C. and then 180-minutes humidifying in an atmosphere of 95% RH at 60° C. was repeated 300 times. After the corrosion test, a depth of corrosion was measured to evaluate corrosion-resistance. Products free from crevice corrosion were evaluated as ○. Products, in which crevice corrosion was detected, were evaluated as x.

Test results shown in Table 3 prove that products according to the present invention were excellent in both of impact strength and corrosion-resistance. Especially, the products exhibits were good of corrosion-resistance in a salty environment, even if they had a structure with crevices.

On the other hand, a fuel tank made of steel F involved work-induced cracks, since the steel F was poor of formability due to excess C in addition to total elongation and value-$r_{min}$ out of the ranges defined by the present invention. Steel sheets G and H were not formed to a tank shape due to occurrence of cracks, since both total elongation and value-$r_{min}$ of the steels G and H were lower than those of the steel F.

Crevice corrosion was not detected in any of fuel tanks made of steels F, G and H, which contained Cr at a predetermined ratio and had plating layers. As for fuel tanks made of a Pb-coated plain steel sheet, an Al-coated plain steel sheet and a naked SUS430 stainless steel sheet, crevice corrosion was detected at seam-welded parts and narrow gaps.

TABLE 3

Impact Strength and Corrosion-Resistance in response to Kind of Corrosion-Preventing Layer

| Base Steel | Corrosion-Preventing Layer | Impact Strength | Corrosion-Resistance at seam-welded part | Corrosion-Resistance at narrow gaps | Note |
|---|---|---|---|---|---|
| A | Zn | ○ | ○ | ○ | Invention |
| A | C.E.paint film | ○ | ○ | ○ | Examples |
| A | Zn + C.E.paint film | ○ | ○ | ○ | |
| B | Zn | ○ | ○ | ○ | |
| B | Zn—Co | ○ | ○ | ○ | |
| C | Zn—Mg | ○ | ○ | ○ | |
| C | Zn | ○ | ○ | ○ | |
| C | Zn-rich paint + C.E.paint film | ○ | ○ | ○ | |
| D | C.E.paint film | ○ | ○ | ○ | |
| D | Zn—Fe | ○ | ○ | ○ | |
| D | Zn-rich paint + Zn—Mg | ○ | ○ | ○ | |
| E | Zn—Sn | ○ | ○ | ○ | |
| E | C.E.paint film | ○ | ○ | ○ | |
| F | Zn | cracked before test | ○ | ○ | Comparative Examples |
| G | Zn—Ni | un-formed | ○ | ○ | |
| H | Zn—Al | un-formed | ○ | ○ | |
| H | Zn | un-formed | ○ | ○ | |
| Plain steel | Pb:100% | — | X | X | |
| Plain steel | Al:100% | — | X | X | |
| SUS430 naked | — | — | X | X | |

Note for Table 3

C.E. paint film means a paint film formed by cathodic electrodeposition coating.

Element symbol means a plating layer composed of the indicated element(s).

According to the present invention as above-mentioned, a fuel tank and a fuel-filler tube for a motor vehicle are made of stainless steel sheets good of formability and corrosion-resistance, which is optionally coated with a Zn or Al plating layer. After the stainless steel sheet is formed to a product shape, a paint film is applied thereto by a cathodic electrodeposition coating process. The product keeps an airtight structure over a long term due to absence of cracks regardless plastic deformation with heavy duty, and its welded parts and narrow gaps are prevented from pitting or crevice corrosion caused by condensation of chloric ion without pinholes. Consequently, the fuel tank and the fuel-filler tube can be used over a long term without diffusion of stored gasoline harmful on the global environment.

What is claimed is:

1. A corrosion-resistant fuel tank for a motor vehicle, which comprises:

a ferritic stainless steel sheet, as base material, which has elongation of 30% or more after fracture by a uniaxial tensile test and minimum Lankford value (value-$r_{min}$) of about 1.3 or more, formed to a product shape; and one or both corrosion-preventing layers of a plating layer of Al, Zn or a Zn alloy containing one or more of Fe, Ni, Co, Mg, Cr and Al and a paint film on a surface of said formed ferritic stainless steel sheet.

2. The corrosion-resistant fuel tank defined by claim 1, wherein the paint film is one cathodically electrodeposited on a whole surface of the formed ferritic stainless steel sheet.

3. The corrosion-resistant fuel tank defined by claim 1, wherein the paint film is a Zn-rich paint film formed on a surface part of the plating layer.

4. The corrosion-resistant fuel tank defined by claim 1, wherein the paint film comprises a Zn-rich paint film on a surface part of the plating layer and a cathodic electrodeposition paint film on a whole surface of the formed ferritic stainless steel sheet.

5. The corrosion-resistant fuel tank defined by claim 1, wherein the ferritic stainless steel sheet has composition comprising C up to about 0.015 mass %, Si up to about 0.5 mass %, about 11.0–25.0 mass % of Cr, N up to about 0.020 mass %, about 0.05–0.50 mass % of Ti, about 0.10–0.50 mass % of Nb, B up to about 0.0100 mass % and the balance being Fe except inevitable impurities.

6. The corrosion-resistant fuel tank defined by claim 5, wherein the ferritic stainless steel sheet further contains Mo up to about 3.0 mass %.

7. The corrosion-resistant fuel tank defined by claim 5, wherein the ferritic stainless steel sheet further contains one or more of Ni up to about 2.0 mass %, about Cu up to 2.0 mass % and about Al up to 4.0 mass %.

8. A corrosion-resistant fuel-filler tube for a motor vehicle, which comprises:

a ferritic stainless steel sheet, as base material, which has elongation of 30% or more after fracture by a uniaxial tensile test and minimum Lankford value (value-$r_{min}$) of about 1.3 or more, formed to a product shape; and one or both corrosion-preventing layers of a plating layer of Al, Zn or a Zn alloy containing one or more of Fe, Ni, Co, Mg, Cr and Al and a paint film on a surface of said formed ferritic stainless steel sheet.

9. The corrosion-resistant fuel-filler tube defined by claim 8, wherein the paint film is one cathodically electrodeposited on a whole surface of the formed ferritic stainless steel sheet.

10. The corrosion-resistant fuel-filler tube defined by claim 8, wherein the paint film is a Zn-rich paint film formed on a surface part of the plating layer.

11. The corrosion-resistant fuel-filler tube defined by claim 8, wherein the paint film comprises a Zn-rich paint film on a surface part of the plating layer and a cathodic electrodeposition paint film on a whole surface of the formed ferritic stainless steel sheet.

12. The corrosion-resistant fuel-filler tube defined by claim 8, wherein the ferritic stainless steel sheet has composition comprising C up to about 0.015 mass %, Si up to about 0.5 mass %, about 11.0–25.0 mass % of Cr, N up to about 0.020 mass %, about 0.05–0.50 mass % of Ti, about 0.10–0.50 mass % of Nb, B up to about 0.0100 mass % and the balance being Fe except inevitable impurities.

13. The corrosion-resistant fuel-filler tube defined by claim 12, wherein the ferritic stainless steel sheet further contains Mo up to about 3.0 mass %.

14. The corrosion-resistant fuel-filler tube defined by claim 12, wherein the ferritic stainless steel sheet further contains one or more of Ni up to about 2.0 mass %, Cu up to about 2.0 mass % and Al up to about 4.0 mass %.

* * * * *